United States Patent
Tomas

(10) Patent No.: US 8,543,264 B1
(45) Date of Patent: Sep. 24, 2013

(54) AIRCRAFT SYSTEM AND METHOD FOR SELECTING AIRCRAFT GLIDING AIRSPEED DURING LOSS OF ENGINE POWER

(75) Inventor: Jan Tomas, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/449,953

(22) Filed: Apr. 18, 2012

(51) Int. Cl.
G05D 1/00 (2006.01)

(52) U.S. Cl.
USPC ........ 701/5; 701/3; 701/18; 701/16; 701/408; 244/3.1; 244/186; 244/32; 244/142; 446/34; 446/63; 446/45; 446/61; 446/64

(58) Field of Classification Search
USPC .......... 701/16, 5, 408; 244/186, 3.1; 446/34, 446/63
See application file for complete search history.

(56) References Cited

U.S. PATENT DOCUMENTS

| | | | |
|---|---|---|---|
| 5,142,480 A | | 8/1992 | Morrow |
| 6,144,899 A | * | 11/2000 | Babb et al. ........................ 701/3 |
| 6,336,838 B1 | * | 1/2002 | Levy et al. ....................... 446/34 |
| 6,573,841 B2 | | 6/2003 | Price |
| 7,167,782 B2 | | 1/2007 | Humbard et al. |
| 7,689,328 B2 | | 3/2010 | Spinelli |
| 8,032,267 B1 | | 10/2011 | Simon |
| 8,087,616 B2 | | 1/2012 | Shuster |
| 2002/0140578 A1 | | 10/2002 | Price |
| 2003/0060940 A1 | | 3/2003 | Humbard et al. |
| 2003/0085807 A1 | * | 5/2003 | Gray ............................. 340/511 |
| 2005/0273220 A1 | | 12/2005 | Humbard et al. |
| 2007/0138345 A1 | * | 6/2007 | Shuster .......................... 244/186 |
| 2011/0118912 A1 | * | 5/2011 | Shuster ........................... 701/18 |
| 2011/0139928 A1 | * | 6/2011 | Morris et al. ............... 244/1 TD |
| 2011/0264312 A1 | | 10/2011 | Spinelli et al. |

OTHER PUBLICATIONS

Petr, F.; Emergency and Precautionary Landing Assistant; IEEEXplore Digital Library.
Siegel, D., et al.; Development of an Autoland System for General Aviation Aircraft; MIT ICAT, Report No. ICAT-2011-09, Sep. 2011.

* cited by examiner

Primary Examiner — Redhwan K Mawari
(74) Attorney, Agent, or Firm — Ingrassia Fisher & Lorenz, P.C.

(57) ABSTRACT

A method and aircraft system are provided for determining an optimal gliding speed that maximizes gliding distance of the aircraft upon engine failure, and comprises calculating the optimal gliding speed from a speed polar curve, true airspeed, heading, and vertical wind speed. The polar curve may be constructed with consideration of the aircraft center of gravity and weight. The calculated gliding speed, which may be restricted to a threshold, is provided to the pilot and optionally to an autopilot. The method is repeated periodically, or if the wind vertical or horizontal velocities exceed a threshold for a predetermined period of time.

14 Claims, 6 Drawing Sheets

AIRCRAFT SYSTEM AND METHOD FOR SELECTING AIRCRAFT GLIDING AIRSPEED DURING LOSS OF ENGINE POWER

TECHNICAL FIELD

The exemplary embodiments described herein generally relate to determining optimal aircraft gliding speed during loss of engine power and more particularly to maximizing aircraft gliding distance for reaching an emergency landing area while experiencing loss of engine power.

BACKGROUND

Under normal operating conditions, an aircraft flies from one airport to another with the pilot controlling power, airspeed, and vertical climb or descent rates, typically for minimizing fuel consumption and/or time en route. With complete or partial engine failure (loss of all or substantially all engine power), a relatively quick determination must be made of gliding speed, rate of descent, and aircraft configuration to maximize the gliding distance for reaching an emergency landing area or airport. With loss of engine power, there are many other tasks to be performed by the pilot, including contacting air traffic control, monitoring other traffic, determining the reason for loss of engine power, for example, low fuel or mechanical malfunction, and attempting to restart the engine. With so many tasks to perform at once, it is difficult to determine and maintain the proper gliding speed for maximizing gliding distance.

The range which an airplane is able to fly without engines can significantly vary based on pilot ability to adjust airplane speed to given conditions, e.g., head wind/tail wind, vertical air flow, and turbulent weather/calm air. If the pilot has not enough experience with gliding, the incorrect setting of the gliding speed may significantly reduce a distance which the airplane may reach. This limits the glide area where the pilot can select a field for emergency landing.

Accordingly, it is desirable to provide a system and method for determining an aircraft gliding speed for maximizing gliding distance during loss of engine power. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for determining an optimal gliding speed of an aircraft for maximizing gliding distance.

In an exemplary embodiment, an aircraft system within an aircraft having one or more engines comprises a first sensor configured to determine a true speed of the aircraft; a second sensor configured to determine a vertical wind speed; a processor coupled to the engines and the first and second sensors, and configured to determine that the engine has lost the ability to provide thrust; calculate an optimal gliding speed for maximizing gliding distance from a speed polar curve, the true airspeed, heading, and the vertical wind speed; provide the optimal gliding speed to a pilot of the aircraft as a selected gliding speed; and repeat the calculation.

In another exemplary embodiment, an aircraft system on board an aircraft having one or more engines provides a recommended gliding speed for achieving a maximum gliding distance upon failure of the engines to provide thrust, the aircraft system comprising a display; and a flight director configured to determine a true airspeed of the aircraft; determine a vertical wind speed; determine that the engine has lost the ability to provide thrust; calculate an optimal gliding speed for maximizing gliding distance from a speed polar curve, the true airspeed, and the vertical wind speed; and display the optimal gliding speed on the display.

In yet another exemplary embodiment, a method for determining an optimal gliding speed for maximizing gliding distance for an aircraft having one or more engines that have lost all thrust, comprises determining a true airspeed of the aircraft; determining a vertical wind speed; determining that the engines have lost all thrust; calculating an optimal gliding speed for maximizing the aircraft gliding distance from a speed polar curve for the aircraft, the true airspeed, heading, and the vertical wind speed; and provide the optimal gliding speed to a pilot of the aircraft.

BRIEF DESCRIPTION OF THE DRAWINGS

The present invention will hereinafter be described in conjunction with the following drawing figures, wherein like numerals denote like elements.

DETAILED DESCRIPTION

Figure 1:
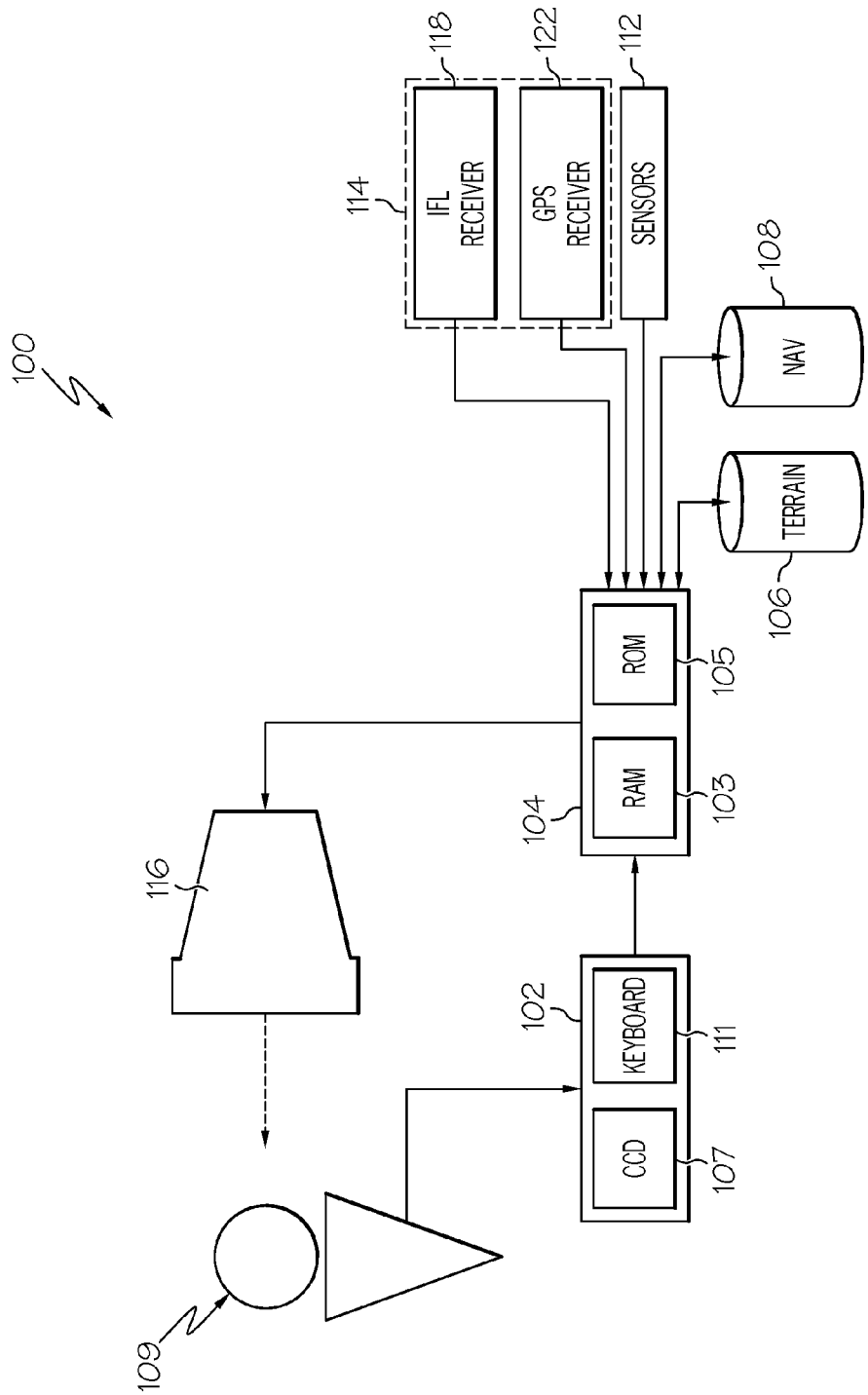
FIG. 1 is a functional block diagram of a typical flight display system.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

A system and method are provided for automatically calculating gliding speed of an aircraft for maximizing gliding distance upon engine failure (loss of all power or thrust). The calculation is performed using the aircraft polar curve of vertical descent versus horizontal travel for the particular aircraft. Data considered for constructing the polar curve include head wind, vertical wind, true airspeed, and optionally the center of gravity (CG) and weight of the aircraft. In one exemplary embodiment, the system calculates the optimal gliding speed with a given time step (for example 0.5 sec). If the calculation is executed for the first time after the engine failure, the optimal gliding speed from the first step of calculation is used as the selected gliding speed. The selected gliding speed is provided to the pilot and/or autopilot. The selected gliding speed is updated to the actual value of the optimal gliding speed when a difference between the selected gliding speed currently used and optimal gliding speed calculated in the current calculation step is higher than a defined threshold (for example 1 kts) or a predefined time to refresh the selected gliding speed has elapsed (for example 10 sec).

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 2:
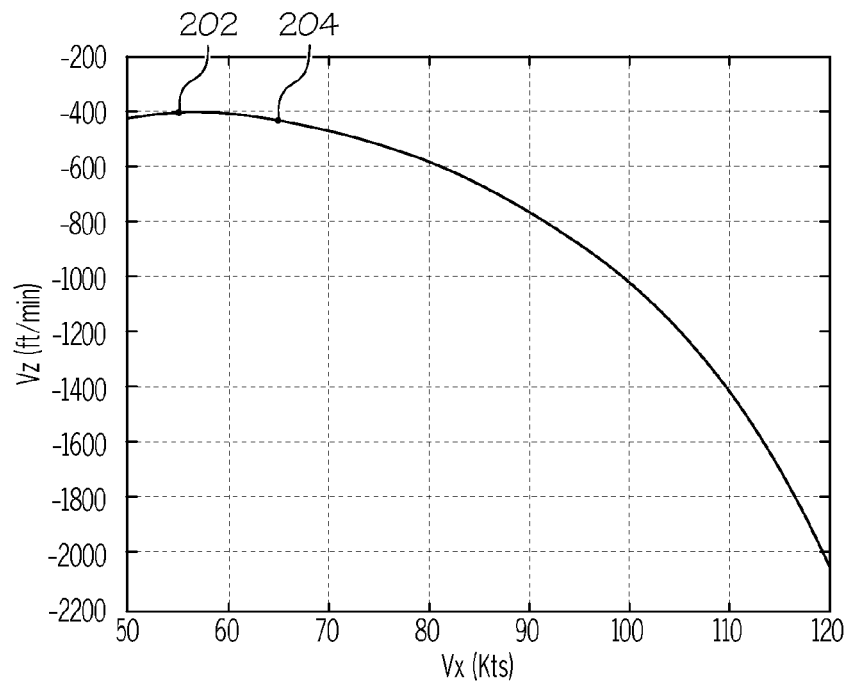
FIG. 2 is a graph of airplane polar speed for vertical rate of descent versus horizontal distance traveled.

Referring to FIG. 1, an exemplary flight deck display system 100 is depicted and will be described. The system 100 includes a user interface 102, a processor 104, one or more terrain databases 106, one or more navigation databases 108, various sensors 112, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein in response to program instructions. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary.

For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only an instrument landing system (ILS) receiver 118 and a global position system (GPS) receiver 122 are depicted in FIG. 1, and will now be briefly described.

As is generally known, the ILS is a radio navigation system that provides aircraft with horizontal (or localizer) and vertical (or glide slope) guidance just before and during landing and, at certain fixed points, indicates the distance to the reference point of landing on a particular runway. The system includes ground-based transmitters (not illustrated) that transmit radio frequency signals. The ILS receiver 118 receives these signals and, using known techniques, determines the glide slope deviation of the aircraft. As is generally known, the glide slope deviation represents the difference between the desired aircraft glide slope for the particular runway and the actual aircraft glide slope. The ILS receiver 118 in turn supplies data representative of the determined glide slope deviation to the processor 104.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

In operation, the display system 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 116 is suitably designed to process data obtained from the sources of flight status data in the manner described in more detail herein. In particular, the display system 116 can use the flight status data of the host aircraft when rendering the display.

The optimal gliding speed for maximum gliding distance that is recommended for each airplane by the manufacturer is only valid for calm air. To maximize gliding distance it is necessary adjust gliding speed to various air conditions. The new optimal gliding speed which corresponds to the actual situation can be recommended to the pilot via display as a number or by flight director markers. Another option is to have the autopilot execute a glide. The difference between the optimal gliding speed for calm air and the optimal gliding speed for current air conditions may be significant, e.g., when the airplane flies with a strong head wind or a strong downward vertical gust. The method and system described herein can be implemented on various markets, from large air transportation airplanes through business jets down to commuters and general aviation.

Figure 3:
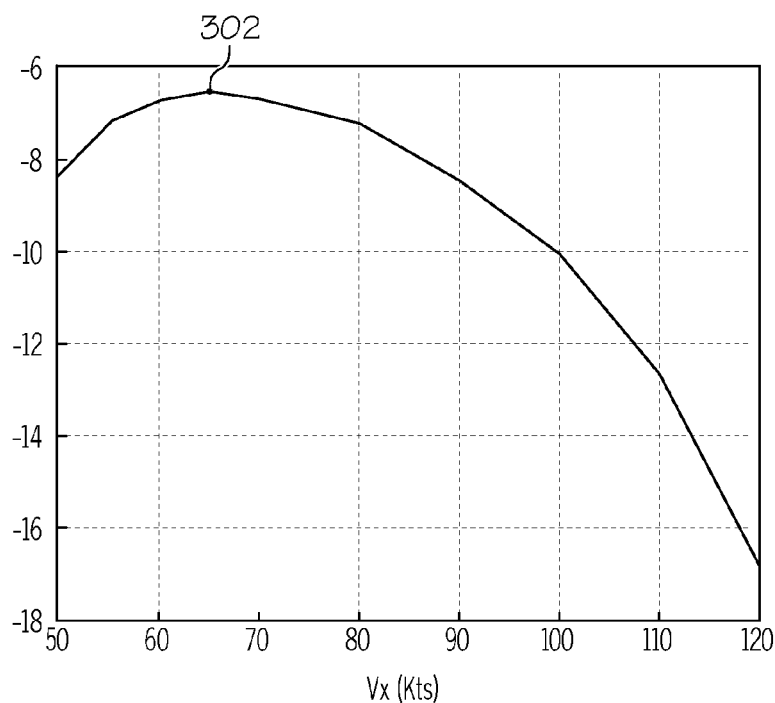
FIG. 3 is a graph of a glide ratio for a typical airplane.

The optimal gliding speed can be considered from two different points of view. The gliding speed can be set to maximize time which the airplane can stay in air, or maximize distance which the airplane may fly. It is possible to calculate or measure airplane gliding properties and construct a polar curve in a $v_x$, $v_z$ coordinate system, where $v_x$ is a forward speed of airplane and $v_z$ is a vertical speed of airplane. The example of this curve is illustrated in the FIG. 2. Point 202 on the polar curve represents the forward speed $v_x$ where the time spent in air is maximal and point 204 is the speed where gliding distance is maximal. It is seen from the example provided below that these two speeds may be different. Point 202 where time spend in air is maximal is $v_{xTime}$=55 kts and a corresponding vertical speed $v_{zTime}$=−398 ft/min while optimal gliding speed (point 204) to maximize distance is $v_{xDist}$=65 kts with corresponding vertical speed $v_z$=−424 ft/min. If the airplane in the provided example is flying at altitude 10,000 ft with a speed $v_{xTime}$=55 kts, then the airplane will remain in air for 10,000/398=25 minutes with a distance flown of approximately 27 miles. If the airplane has a speed of $V_{xDist}$=65 kts with a corresponding vertical speed of $v_z$=−424 ft/min, then the airplane will remain in the air for 10,000/424=23 minutes with a distance of approximately 28.5 miles. The optimal gliding speed corresponds to a maximal ratio $v_z/v_x$. The glide ratio curve for this airplane calculated from the speed polar curve is provided in the FIG. 3. It can be seen in FIG. 3 that the maximum value (point 302) of glide ratio really corresponds with a speed of 65 kts which is (as referred to in the text above) the optimal gliding speed for this particular example.

The example provided above shows that optimal gliding speed can be determined for an airplane from the polar curve and this speed is conventionally provided in the flight manual by the airplane manufacturer. The usage of this speed as an optimum is valid only in calm air. If, for example, there is a strong head wind equal to the recommended gliding speed, the distance flown against with respect to ground will be equal to 0 miles. For this reason, the effect of wind and vertical turbulence needs to be taken in account in determining the optimal gliding speed for maximizing gliding distance.

Consider the situation where the same airplane is flying with a 30 kts head wind. The head wind speed is added to the $v_x$ to calculate ground speed. If the pilot uses the same recommended gliding speed as in the case of calm air, $v_{xDist}$=65 kts. The ground speed will be 35 kts ($v_z$=−424 ft/min will remain the same) and maximal reachable distance with this head wind will be approximately 15.4 miles. If the pilot adjusts gliding speed in consideration of this head wind, the new optimal speed will be 80 kts (ground speed 50 kts). The corresponding vertical speed is $v_z$=−579 ft/min, time spend in air will be 10,000/579=17 min, and distance will be approximately 16.3 miles. Therefore, this deviation from recommended speed in the flying manual in view of the headwind may add 0.9 mile in distance if the gliding speed is adjusted for the head wind.

Similar examples can be constructed for cases when vertical turbulences change actual $v_z$. The polar curve can be considered as function of $v_x$:

$$v_z = f(v_x)$$

Since the airplane polar curve can be measured or calculated from the airplane parameters and typically is provided by the airplane manufacturer, this function is used for calculation of the optimal gliding speed by the system if additional data is available—mainly horizontal wind speed and wind direction, and information about vertical speed. Then the wind component ($V_{Wind}$) in direction of airplane axis X, may be calculated from the current airplane heading wind direction and wind speed. Assuming the flight path angle is not extremely high, the assumption may be made that the deviation of the true airspeed and $v_x$ in negligible. Taking information about vertical speed during a glide from airplane instruments, for example, an attitude heading reference system, the $v_z$ can be estimated from the polar curve while providing the value of actual vertical speed ($v_{Gust}$).

If the airplane is at the altitude $h_0$ at the time when engine is lost, the distance which can be flown from the current altitude $h_0$ is as follows (assuming that the value of $V_{Wind}$ has same direction as $v_x$, $v_y$:

$$dist = (v_x + v_{Wind})\frac{h_0}{(v_x + v_{Gust})} = h_0\frac{(v_x + v_{Wind})}{f(v_x) + V_{Gust}}$$

Solving the following equation to find maximum distance in accordance with the selected true airspeed:

$$\frac{d}{dv_x}dist = \frac{d}{dv_x}\left(h_0\frac{(v_x + v_{Wind})}{f(v_x) + V_{Gust}}\right) = 0$$

Provides the following equation:

$$(f(v_x) + v_{Gust}) - (v_x + v_{Wind})\frac{d}{dv_x}(f(v_x)) = 0$$

The value of $v_x$ has to be examined to find a predicted maximum. This speed is then the true airspeed which is the best true airspeed to maximize reachable distance.

Another option is to directly evaluate the gliding ratio $G_R$ for various values of $v_x$ (true airspeed) for current inputs ($V_{Wind}$, $V_{Gust}$):

$$G_R = \frac{v_x + v_{Gust}}{v_x + v_{Wind}} = \frac{f(v_x) + v_{Gust}}{v_x + v_{Wind}}$$

$$v_x : G_R(v_x) \to \text{MAX}$$

Note that a direct evaluation has to take in account a case when $v_x+v_{Wind}=0$, which may happen in theory when the airplane flies the same ground speed as the head wind speed, which is an improbable case for most of contemporary airplanes; however, protection against dividing by zero needs to be implemented to ensure any software exceptions.

Figure 4:
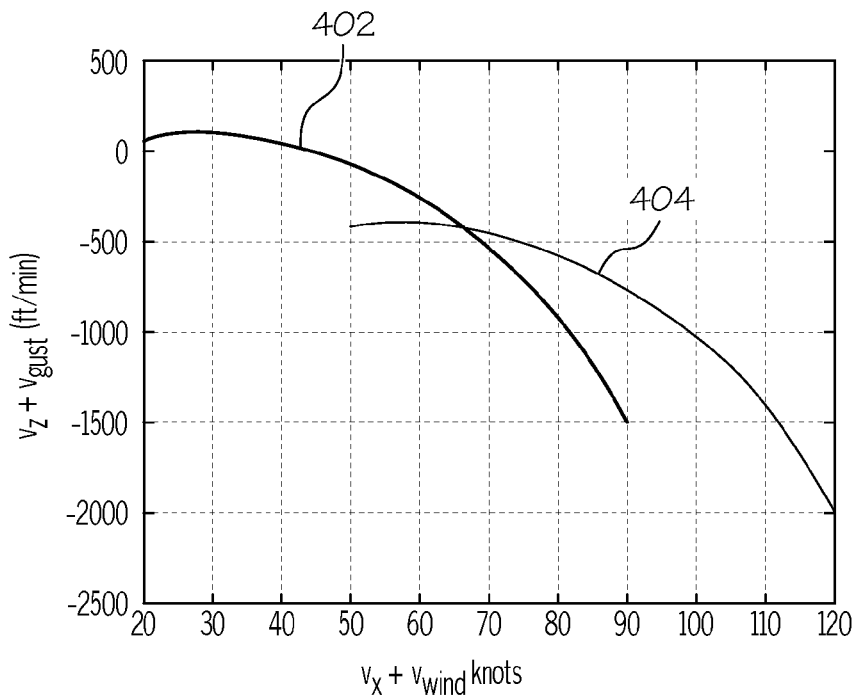
FIG. 4 is a graph of airplane polar speed for two wind conditions.

The example of how head wind and vertical gust impacts the airplane polar curve is illustrated in the FIG. 4: the original airplane polar curve 402 for calm air (resulting in an optimal gliding speed of 55 kts) and the polar curve 404 which corresponds to the current wind (−30 kts) and the vertical gust (500 ft/min) (resulting in an optimal gliding speed of 90 kts).

An optimal gliding speed is calculated (by either of the above described methods) periodically within a given time (for example 0.5 sec). A selected gliding speed is set to the calculated optimal gliding speed when the calculation of optimal gliding speed is executed first time after engine failure. The selected gliding speed is recommended to the pilot by the flight director markers or as a displayed number or by any other way, and/or the plane assumes the selected gliding speed by autopilot. Because the horizontal wind may change as well as vertical speed vGust, the selected gliding speed is compared in each calculation time step with the currently calculated optimal gliding speed. The selected gliding speed is updated to the actual value of the currently calculated optimal gliding speed if:

1) the currently calculated optimal gliding speed differs from the selected gliding speed for more than a given threshold (for example 1 kts), or
2) a pre-defined refresh time for selected gliding speed elapsed (for example 10 sec).

Note that the calculation is dependent on how precisely the polar curve is described. It is possible to measure or calculate the polar curve under various mass and various CG locations. Some aircraft systems may calculate mass and CG position, which can be used to select best polar curve for given flight. For example, some avionics systems allow the pilot to complete an electronic weight balance sheet to verify CG position. This input combined with fuel consumption information may be used for a speed polar curve adjustment per actual airplane weight.

The algorithm with periodic recalculation is simulated to evaluate efficiency in the polar curve of FIG. 4. Assuming the total airplane vertical speed is $v_z+v_{Gust}$ and altitude is calculated as follows:

$$h_1 = h_0 - \int v_z + v_{Gust} dt$$

where the initial altitude is set to 10,000 feet.
The distance is calculated as follows:

$$d_1 = \int v_x + v_{Wind} dt$$

Figure 5:
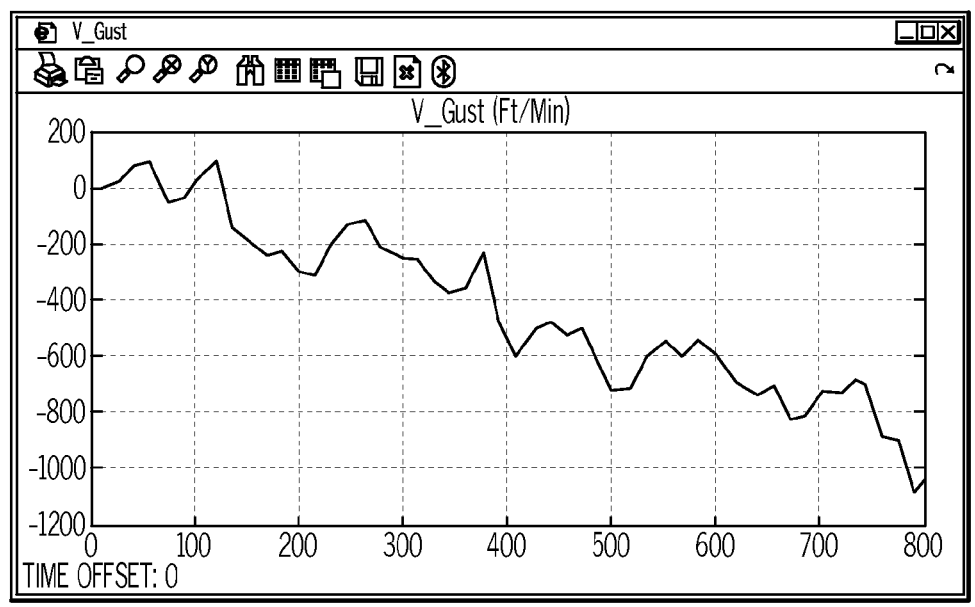
FIG. 5 is a graph of a vertical gust used in simulation.
Figure 6:
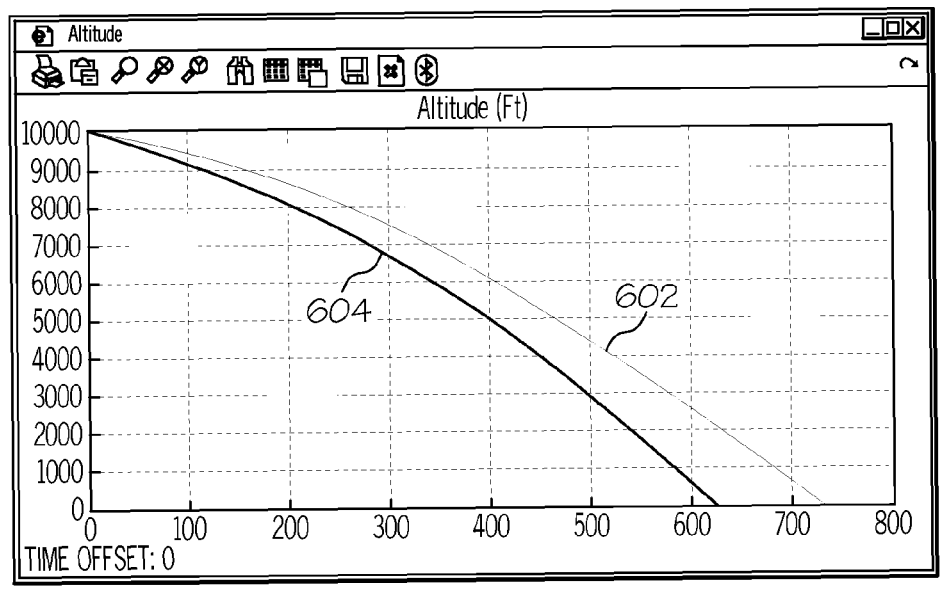
FIG. 6 is a graph of altitude versus time for a gliding airplane.
Figure 7:
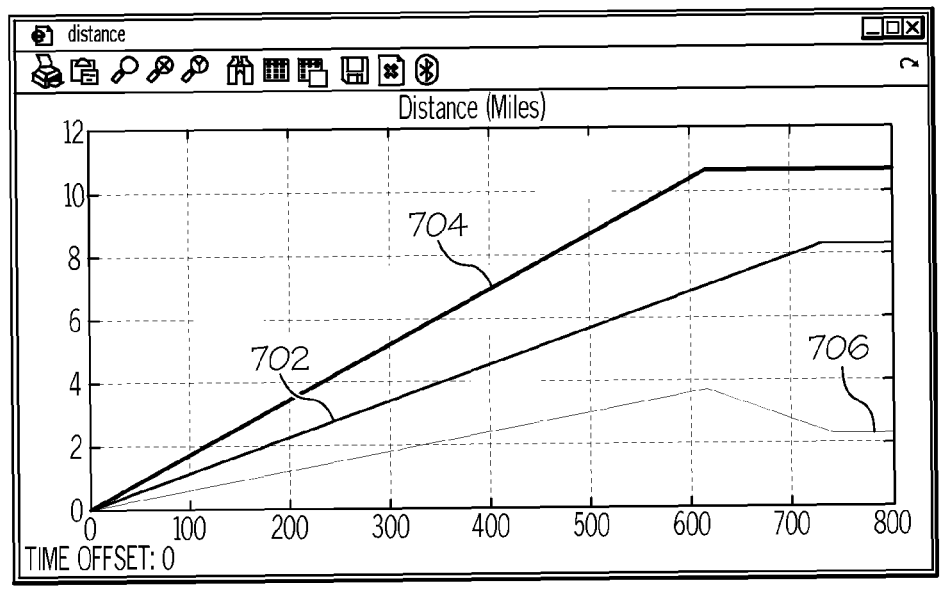
FIG. 7 is a graph of distance flown versus time for a gliding airplane.

A vertical gust is simulated in the range of −1200 ft/min+120 ft/min (gust values per time are captured in FIG. 5), and a constant head wind is −30 kts across the altitude. A simulation was run for the proposed algorithm and was compared with constant speed which is recommended for an airplane in calm air. The distance calculation for each method was stopped when a corresponding altitude reached 0 ft. The optimized algorithm for the example described above extends the range 2.3 miles (from 8.3 miles to 10.6 miles). FIG. 6 shows altitude/time changes. The curve 602 is altitude during time for an airplane which flies the recommended speed for a calm atmosphere while the curve 604 shows altitude during time for an airplane which used the algorithm described above to adjust gliding speed. It is seen that time spend in the air is longer if the gliding speed is not adjusted. FIG. 7 shows the distance reached by both airplanes. The curve 702 is distance flown by the airplane which flies the recommended speed for calm atmosphere, the curve 704 is distance flown by the airplane which flies the gliding speed calculated by the algorithm described above, and curve 706 is the distance difference between both airplanes. The airplane using the gliding speed suggested by the described algorithm flew more than 2 miles further than the airplane which used recommended speed for calm atmosphere.

Figure 8:
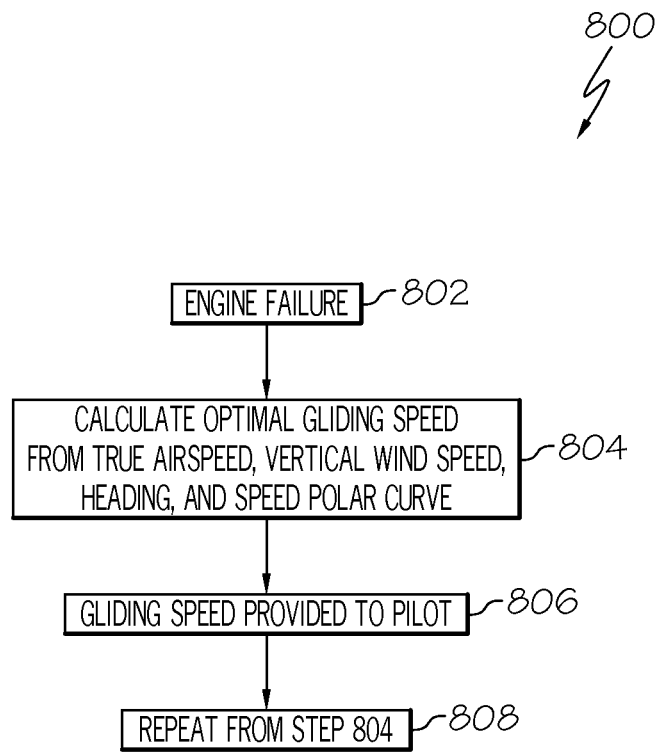
FIG. 8 is a flow chart in accordance with an exemplary embodiment.
Figure 9:
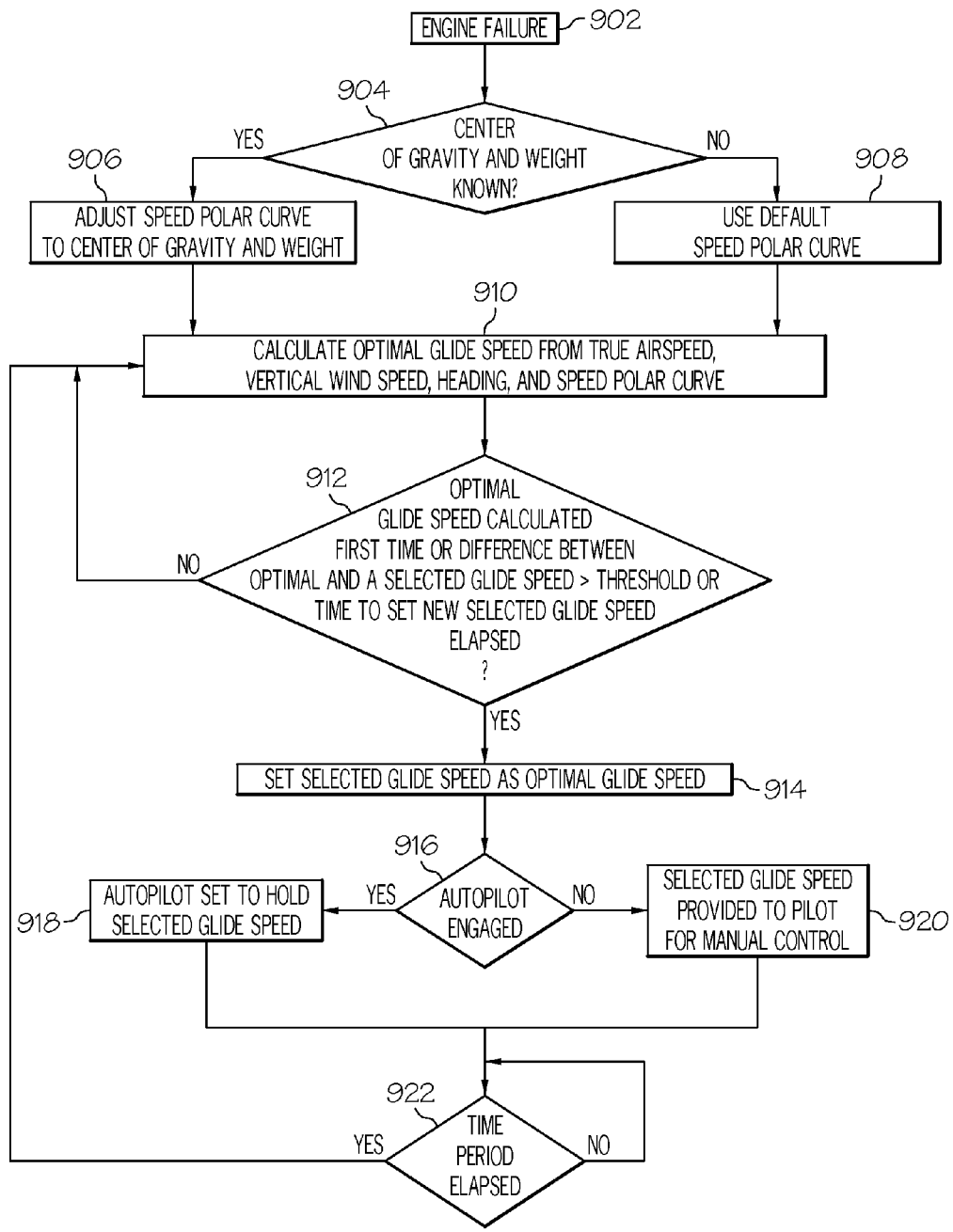
FIG. 9 is a flow chart in accordance with further exemplary embodiments.

FIGS. 8 and 9 are flow charts that illustrate exemplary embodiments of a process 800 and 900 representing implementations of methods for determining a gliding speed of an aircraft that has lost engine power. The various tasks performed in connection with processes 800 and 900 may be performed by software, hardware, firmware, or any combination thereof. For illustrative purposes, the following description of processes 800 and 900 may refer to elements mentioned above in connection with FIG. 1-7. In practice, portions of processes 800 and 900 may be performed by different elements of the described system, e.g., a processor, a display element, or a flight director system. It should be appreciated that processes 800 and 900 may include any number of additional or alternative tasks, the tasks shown in FIGS. 8 and 9 need not be performed in the illustrated order, and processes 800 and 900 may be incorporated into a more comprehensive procedure or process having additional functionality not described in detail herein. Moreover, one or more of the tasks shown in FIGS. 8 and 9 could be omitted from an embodiment of the processes 800 and 900 as long as the intended overall functionality remains intact.

Referring to FIG. 8, when an engine failure occurs 802 (loss of all power or thrust) in a first exemplary embodiment, a processor (flight director) calculates 804 the optimal gliding speed from the true airspeed, vertical wind speed, heading, and a polar curve (pre-determined for that particular aircraft). The optimal gliding speed is provided 806 to the pilot, for example, by displayed numbers or markers. These steps are repeated 808 from step 804.

Referring to FIG. 9 for additional exemplary embodiments, when an engine failure occurs 902 (loss of all power or thrust) and the aircraft center of gravity and weight are known 904, the speed polar curve is adjusted 906 to the center of gravity and weight. If the center of gravity and weight are not known 904, a default speed polar curve (typically provided by the aircraft manufacturer) is used 908. The optimal gliding speed is then calculated 910 from the true airspeed of the aircraft, the vertical wind speed, heading, and the speed polar curve.

If in step 912 the optimal gliding speed has been calculated for the first time, or a difference between the optimal gliding speed and a selected gliding speed exceeds a threshold, or the time to set a new selected gliding speed has elapsed (for example 10 sec), the selected gliding speed is set 914 to the value of the optimal gliding speed calculated in step 910. If none of the conditions in step 912 are met, step 910 is repeated.

If the aircraft's autopilot is engaged 916, the autopilot is set 918 to hold the selected gliding speed. If the autopilot is not engaged 916, the pilot is notified 920 of the selected gliding speed for example, via a display as a number or by flight director markers, and the pilot assumes that speed manually. When a time period for the optimal gliding speed calculation has elapsed 922 (for example 0.5 sec), the steps are repeated 922 from step 910.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. An aircraft system within an aircraft having one or more engines, the aircraft system comprising:
   a first sensor configured to determine a true speed of the aircraft;
   a second sensor configured to determine a vertical wind speed;
   a processor coupled to the engines and the first and second sensors, and configured to:
      determine that the engine has lost the ability to provide thrust;
      provide a center of gravity and a weight of the aircraft;
      adjust a speed polar curve considering the center of gravity and weight;
      calculate an optimal gliding speed for maximizing gliding distance from the speed polar curve, the true airspeed, heading, and the vertical wind speed, if at least one of a change of a vertical wind speed or a change of a horizontal wind speed exceeds a threshold for a period of time;
      provide the optimal gliding speed to a pilot of the aircraft as a selected gliding speed; and
      repeat the calculation.

2. The aircraft system of claim 1 wherein the speed polar curve is provided by the manufacturer of the aircraft.

3. The aircraft system of claim 1 further comprising an autopilot, wherein the processor is further configured to:
   provide the selected gliding speed to the autopilot that causes the aircraft to assume the gliding speed.

4. The aircraft system of claim 1 wherein the processor is further configured to:
   prevent the selected gliding speed from exceeding a threshold airspeed.

5. The aircraft system of claim 1 wherein the processor is further configured to:
   periodically repeat the calculation of the optimal gliding speed.

6. An aircraft system on board an aircraft having one or more engines, the aircraft system providing a recommended gliding speed for achieving a maximum gliding distance upon failure of the engines to provide thrust, the aircraft system comprising:
   a display; and
   a flight director configured to:
      determine a true airspeed of the aircraft;
      determine a vertical wind speed;
      determine that the engine has lost the ability to provide thrust;

provide a center of gravity and a weight of the aircraft;

adjust the speed polar curve considering a center of gravity and weight;

calculate an optimal gliding speed for maximizing gliding distance from the speed polar curve, the true airspeed, and the vertical wind speed, if at least one of a change of a vertical wind speed and a change of a horizontal wind speed exceeds a threshold for a period of time; and display the optimal gliding speed on the display.

7. The aircraft system of claim 6 wherein the speed polar curve is provided by the manufacturer of the aircraft.

8. The aircraft system of claim 6 further comprising an autopilot coupled to the flight director, the autopilot configured to:

cause the aircraft to assume the optimal gliding speed.

9. The aircraft system of claim 6 wherein the flight director is further configured to:

prevent the optimal gliding speed from exceeding a threshold airspeed.

10. The aircraft system of claim 6 wherein the flight director is further configured to:

periodically repeat the calculation of the optimal gliding speed.

11. A method for determining an optimal gliding speed for maximizing gliding distance for an aircraft having one or more engines that have lost all thrust, comprising:

determining a true airspeed of the aircraft;

determining a vertical wind speed;

determining that the engines have lost all thrust;

providing a center of gravity and a weight of the aircraft;

adjust a speed polar curve considering the center of gravity and weight;

calculating an optimal gliding speed for maximizing the aircraft gliding distance from the speed polar curve for the aircraft, the true airspeed, heading, and the vertical wind speed, if at least one of a change of an aircraft vertical velocity and a change of a horizontal wind speed exceeds a threshold for a period of time; and provide the optimal gliding speed to a pilot of the aircraft.

12. The aircraft system of claim 11 further comprising:

providing the optimal gliding speed to an autopilot that causes the aircraft to assume the gliding speed.

13. The aircraft system of claim 11 further comprising:

preventing the calculated gliding speed from exceeding a threshold airspeed.

14. The aircraft system of claim 11 further comprising:

periodically repeating the calculation of the optimal gliding speed.

* * * * *